US011409293B2

(12) United States Patent
Ha et al.

(10) Patent No.: US 11,409,293 B2
(45) Date of Patent: Aug. 9, 2022

(54) METHOD AND APPARATUS FOR OPERATING AUTONOMOUS SHUTTLE USING EDGE COMPUTING

(71) Applicants: Hyundai Motor Company, Seoul (KR); Kia Motors Corporation, Seoul (KR)

(72) Inventors: Jae Jun Ha, Hwaseong-si (KR); Young Jun Moon, Sejong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

(21) Appl. No.: 16/831,318

(22) Filed: Mar. 26, 2020

(65) Prior Publication Data

US 2020/0319647 A1 Oct. 8, 2020

(30) Foreign Application Priority Data

Apr. 3, 2019 (KR) .......................... 10-2019-0039135

(51) Int. Cl.
*G05D 1/02* (2020.01)
*H04W 4/40* (2018.01)
*B60R 1/00* (2022.01)
*B60R 11/04* (2006.01)

(52) U.S. Cl.
CPC ............. *G05D 1/0212* (2013.01); *B60R 1/00* (2013.01); *B60R 11/04* (2013.01); *G05D 1/0251* (2013.01); *G05D 1/0276* (2013.01); *H04W 4/40* (2018.02); *B60R 2300/8086* (2013.01); *G05D 2201/0213* (2013.01)

(58) Field of Classification Search
CPC .. G01D 1/0212; G01D 1/0251; G01D 1/0276; H04W 4/40; B60R 11/04

USPC .......................................................... 701/24
See application file for complete search history.

(56) References Cited

U.S. PATENT DOCUMENTS

| 9,488,984 | B1* | 11/2016 | Williams | ............. G06K 9/2036 |
| 2016/0132705 | A1* | 5/2016 | Kovarik | ............. G06K 7/10376 |
| | | | | 340/10.3 |
| 2018/0072265 | A1* | 3/2018 | Samadani | ............. B60R 28/04 |
| 2018/0088587 | A1* | 3/2018 | Lee | ........................ G05D 1/0238 |
| 2018/0188738 | A1* | 7/2018 | Tatourian | ............. G05D 1/0246 |
| 2018/0299274 | A1 | 10/2018 | Moghe et al. | |

(Continued)

FOREIGN PATENT DOCUMENTS

WO 2016130719 A2 8/2016
WO 2018125483 A1 7/2018

OTHER PUBLICATIONS

Gu, Haifeng, et al., "A Collaborative and Sustainable Edge-Cloud Architecture for Object Tracking with Convolutional Siamese Networks", IEEE Transactions on Sustainable Computing, Nov. 22, 2019, 10 pages.

*Primary Examiner* — Yazan A Soofi
(74) *Attorney, Agent, or Firm* — Slater Matsil, LLP

(57) ABSTRACT

A method of operating an autonomous shuttle includes attempting to recognize a guideline based on a route recognition device of the autonomous shuttle, transmitting an additional information request message to first nodes located within a predetermined range from the autonomous shuttle when failing to recognize the guideline, receiving a response message to the additional information request message from the first nodes, and driving along the guideline based on the received response message.

20 Claims, 9 Drawing Sheets

(56) References Cited

U.S. PATENT DOCUMENTS

| | | | | |
|---|---|---|---|---|
| 2018/0345963 | A1* | 12/2018 | Maura | G05D 1/0223 |
| 2018/0359904 | A1* | 12/2018 | Foster | G05D 1/0223 |
| 2019/0197699 | A1* | 6/2019 | Maehara | G06T 7/70 |
| 2019/0265703 | A1* | 8/2019 | Hicok | G06Q 50/30 |
| 2020/0319647 | A1* | 10/2020 | Ha | G08G 1/096758 |
| 2020/0320864 | A1* | 10/2020 | Wengreen | G08G 1/0133 |
| 2021/0063200 | A1* | 3/2021 | Kroepfl | G01C 21/1652 |
| 2021/0200238 | A1* | 7/2021 | Galoogahi | G05D 1/0246 |
| 2022/0009424 | A1* | 1/2022 | Kirchhoff | B60R 1/00 |

* cited by examiner

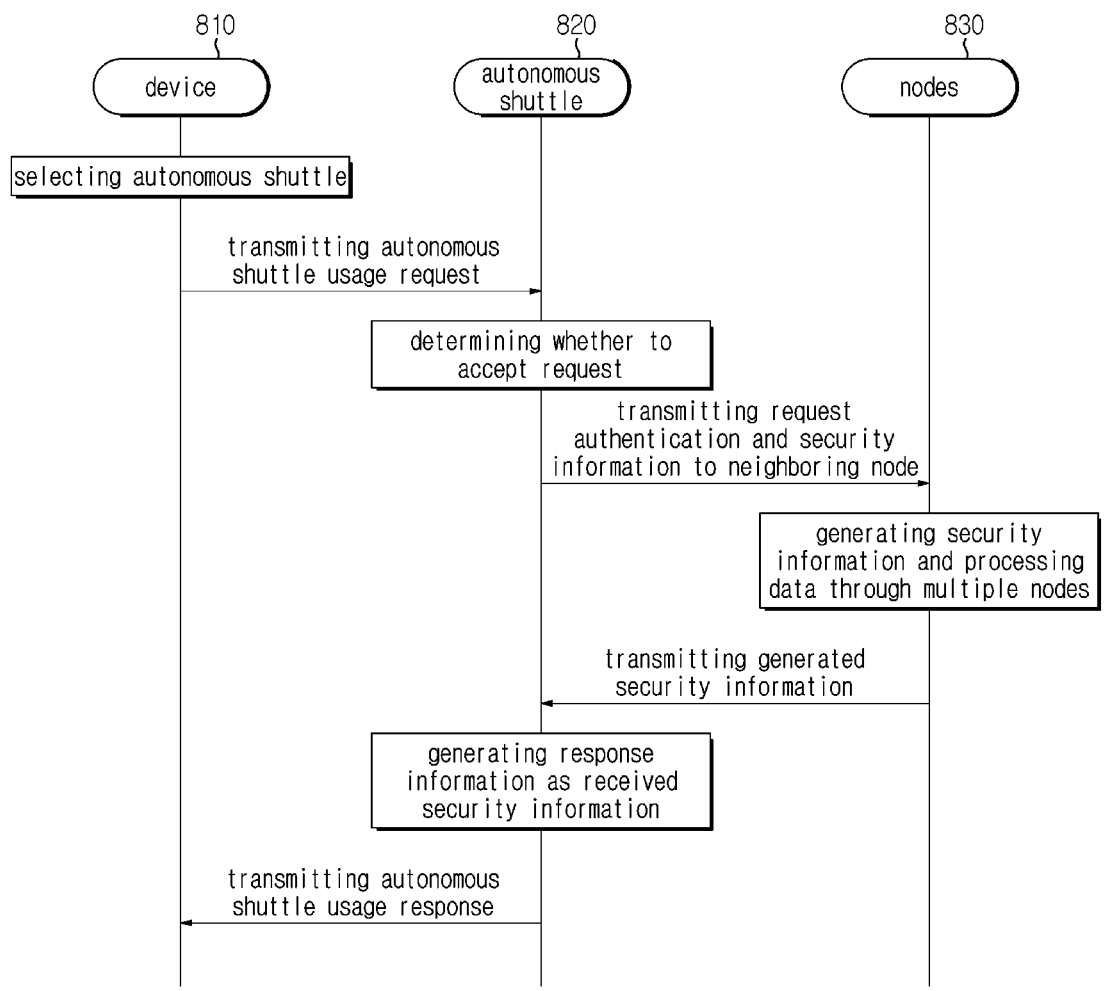

METHOD AND APPARATUS FOR OPERATING AUTONOMOUS SHUTTLE USING EDGE COMPUTING

CROSS-REFERENCE TO RELATED APPLICATIONS

This application claims priority to Korean Patent Application No. 10-2019-0339135, filed on Apr. 3, 2019, which application is hereby incorporated herein by reference.

TECHNICAL FIELD

The present invention relates to a method and apparatus for operating an autonomous shuttle at low cost.

BACKGROUND

As technology advances, the interest in autonomous driving of vehicles has increased. In particular, many technological advances have been made on a method that increases user convenience and provides efficient service through autonomous driving of a vehicle. However, in order to implement autonomous driving of a vehicle, many advanced technologies need to be applied to a vehicle, and a high cost may be required to implement the autonomous vehicle. Accordingly, there is a need for an autonomous shuttle implemented at low cost.

SUMMARY

The present invention relates to a method and apparatus for operating an autonomous shuttle at low cost. Particular embodiments relate to a method and apparatus for operating an autonomous shuttle that drives on the basis of edge computing.

Embodiments of the present invention provide a method and apparatus for operating an autonomous shuttle at low cost.

Embodiments of the present invention provide a method and apparatus for operating an autonomous shuttle driving along a guideline at low cost.

Embodiments of the present invention provide a method and apparatus for operating an autonomous shuttle operated on the basis of edge computing at low cost.

According to an embodiment of the present invention, a method of operating an autonomous shuttle includes recognizing a guideline on the basis of a route recognition means of the autonomous shuttle, transmitting an additional information request message to first nodes located within a predetermined range from the autonomous shuttle when failing to recognize the guideline, receiving a response message to the additional information request message from the first nodes, and driving along the guideline on the basis of the received response message.

In addition, according to an embodiment of the present invention, an autonomous shuttle driving in an autonomous driving manner includes a camera unit capturing an image, a transceiver performing communication with another device, and a processor controlling the camera unit and the transceiver, wherein the processor recognizes a guideline on the basis of a route recognition means of the autonomous shuttle, transmits an additional information request message to first nodes located within a predetermined range from the autonomous shuttle when failing to recognize the guideline, receives a response message to the additional information request message from the first nodes, and drives along the guideline on the basis of the received response message.

In addition, according to an embodiment of the present invention, a system for operating an autonomous shuttle includes an autonomous shuttle, and a plurality of nodes, wherein the autonomous shuttle recognizes a guideline on the basis of a route recognition means of the autonomous shuttle. When the autonomous shuttle fails to recognize the guideline, the autonomous shuttle transmits an additional information request message to the first nodes located within a predetermined range from the autonomous shuttle. The autonomous shuttle receives a response message to the additional information request message from the first nodes, and the autonomous shuttle drives along the guideline on the basis of the received response message.

In addition, according to an embodiment of the present invention, the system for operating the autonomous shuttle further includes a server, and the autonomous shuttle and the plurality of nodes may be registered and managed by the server.

In addition, the followings may be applied in common to the autonomous shuttle operating method, the autonomous shuttle, and the system.

In addition, according to an embodiment of the present invention, the route recognition means may be at least one camera provided in the autonomous shuttle, and the guideline may be recognized on the basis of the at least one camera.

In addition, according to an embodiment of the present invention, information obtained through the route recognition means may be displayed through a map of the autonomous shuttle, and the information obtained through the route recognition means may include at least one of information on the guideline and information on surrounding objects of the autonomous shuttle.

In addition, according to an embodiment of the present invention, the map of the autonomous shuttle may be displayed on the basis of at least one of a two-dimensional map, a three-dimensional map, a multi-map, and a high definition (HD) map.

In addition, according to an embodiment of the present invention, when the autonomous shuttle and the first nodes perform data exchange, the autonomous shuttle and the first nodes may perform the data exchange through a first frame format on the basis of a first type protocol.

In addition, according to an embodiment of the present invention, the method may further include performing data exchange with a cloud by the autonomous shuttle or the first nodes, wherein when the autonomous shuttle or the first nodes perform the data exchange with the cloud, the data exchange is performed through a second frame format on the basis of a second type protocol.

In addition, according to an embodiment of the present invention, at least one of guideline recognition information, route related information, and real-time processing information may be exchanged between the autonomous shuttle and the first nodes on the basis of the first type protocol.

In addition, according to an embodiment of the present invention, at least one of node registration information, node management information, and history information may be exchanged between the cloud and the autonomous shuttle or the first nodes on the basis of the second type protocol.

In addition, according to an embodiment of the present invention, the autonomous shuttle may receive the node registration information and the node management information from the cloud through the second protocol on the basis of location information of the autonomous shuttle.

In addition, according to an embodiment of the present invention, when the autonomous shuttle does not perform communication with the cloud, the first type protocol and the first frame format may be preset between the autonomous shuttle and the first nodes.

In addition, according to an embodiment of the present invention, at least one of guideline recognition information, route related information, and real-time processing information may be exchanged between the autonomous shuttle and the first nodes on the basis of the first type protocol, and history information may be stored in the autonomous shuttle.

In addition, according to an embodiment of the present invention, the autonomous shuttle may be provided with at least one camera for photographing a driving road, and the guideline may be recognized through the at least one camera for photographing the driving road.

In addition, according to an embodiment of the present invention, when the autonomous shuttle fails to recognize the guideline, the autonomous shuttle may transmit the additional information request message to the first nodes on the basis of a location where the autonomous shuttle fails to recognize the guideline.

In addition, according to an embodiment of the present invention, each of the first nodes may obtain image information at a location of the autonomous shuttle on the basis of the received additional information request message, and the obtained image information may be transmitted to the autonomous shuttle.

In addition, according to an embodiment of the present invention, when the autonomous shuttle receives the response message from each of the first nodes, the autonomous shuttle may re-recognize the guideline through the image information included in the response message.

In addition, according to an embodiment of the present invention, when the autonomous shuttle fails to re-recognize the guideline, the autonomous shuttle may interrupt driving.

In addition, according to an embodiment of the present invention, each of the first nodes may obtain image information at a location of the autonomous shuttle on the basis of the received additional information request message, directly obtain route information of the autonomous shuttle on the basis of the obtained image information, and transmit the obtained route information to the autonomous shuttle.

In addition, according to an embodiment of the present invention, when the autonomous shuttle receives the response message from each of the first nodes, the autonomous shuttle may drive through the route information included in the response message.

According to embodiments of the present invention, it is possible to provide a method and apparatus for operating an autonomous shuttle at low cost.

According to embodiments of the present invention, it is possible to provide a method and apparatus for operating an autonomous shuttle driving along a guideline at low cost.

According to embodiments of the present invention, it is possible to provide a method and apparatus for operating an autonomous shuttle operated on the basis of edge computing at low cost.

Technical problems to be achieved in embodiments of the present invention are not limited to the above-mentioned technical problems, and other technical problems not mentioned above will be clearly understood by those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which:

FIG. 8 illustrates a method of using an autonomous shuttle using edge computing;

DETAILED DESCRIPTION OF ILLUSTRATIVE EMBODIMENTS

Figure 1:
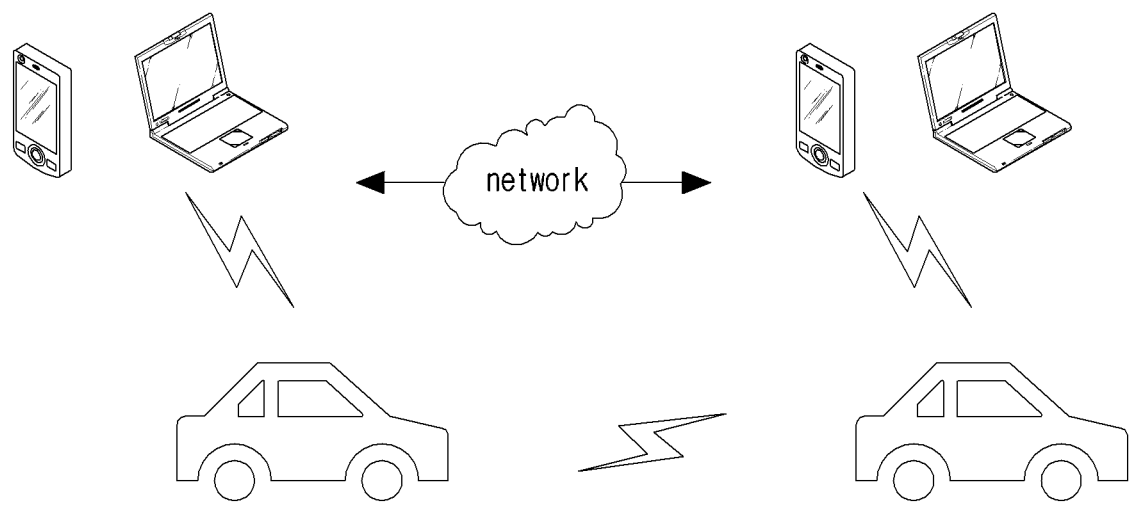
FIG. 1 is a diagram illustrating a method in which a vehicle communicates with other devices.

Hereinafter, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure rather unclear. Parts not related to the description of the embodiments of the present disclosure in the drawings are omitted, and similar parts are denoted by similar reference numerals.

In the present disclosure, when a component is "connected", "coupled", or "fixed" to another component, it means that the component is not only directly connected to the another component, but also the component is indirectly connected to the another component with other components in between. In addition, when a component "includes" or "has" another component, it means that the component may further include another component without excluding other components, unless specifically stated otherwise.

In the present disclosure, terms such as first and second are used only for the purpose of distinguishing one component from other components, and do not limit the order or importance between the components unless specifically mentioned. Accordingly, within the scope of the present disclosure, a first component in one embodiment may be referred to as a second component in another embodiment, and likewise, a second component in one embodiment may be referred to as a first component in another embodiment.

In the present disclosure, the components distinguished from each other are for clearly describing each feature, and do not necessarily mean that the components are separated.

That is, a plurality of components may be integrated into one hardware or software unit, or one component may be distributed and formed into a plurality of hardware or software units. Therefore, even if not mentioned otherwise, such integrated or distributed embodiments are included in the scope of the present disclosure.

In the present disclosure, components described in various embodiments do not necessarily mean essential components, and some of them may be optional components. Therefore, an embodiment composed of a subset of components described in an embodiment is also included in the scope of the present disclosure. In addition, embodiments including other components in addition to the components described in the various embodiments are included in the scope of the present disclosure.

Advantages and features of embodiments of the present invention, and methods for achieving them, will be apparent with reference to the embodiments described below in detail with reference to the accompanying drawings. However, the present disclosure is not limited to the embodiments set forth below, but may be implemented in various forms, and only the present embodiments are provided to make the spirit of the present invention complete, and to fully inform those of ordinary skill in the art of the scope of the invention.

FIG. 1 is a diagram illustrating a method in which a moving object communicates with other moving objects or devices through a network. Referring to FIG. 1, a moving object may communicate with other moving objects or other devices. Herein, as an example, the moving object may communicate with other moving objects or other devices, based on cellular communication, WAVE communication, dedicated short range communication (DSRC), or another communication scheme. That is, as the cellular communication network, a communication network such as LTE, 5G, Wi-Fi communication network, WAVE communication network, etc. may be used. In addition, a local area network used in a moving object such as DSRC may be used, but the present disclosure is not limited thereto. The moving object may have equipment capable of performing communication, and communicate with another device on the basis of the equipment.

In addition, for example, with respect to the communication of a moving object, a module capable of communication only with a device located inside the moving object and a module capable of communication with a device outside the moving object may be separated from each other for the security of the moving object. For example, inside a moving object, communication may be performed on the basis of security only for a device within a certain range of the moving object, such as Wi-Fi communication. For example, a moving object and a moving object driver's personal device may include a communication module for performing only communication with each other. That is, the moving object and the moving object driver's personal device may use a communication network that is blocked from an external communication network. In addition, as an example, the moving object may include a communication module for performing communication with an external device.

Figure 2A:
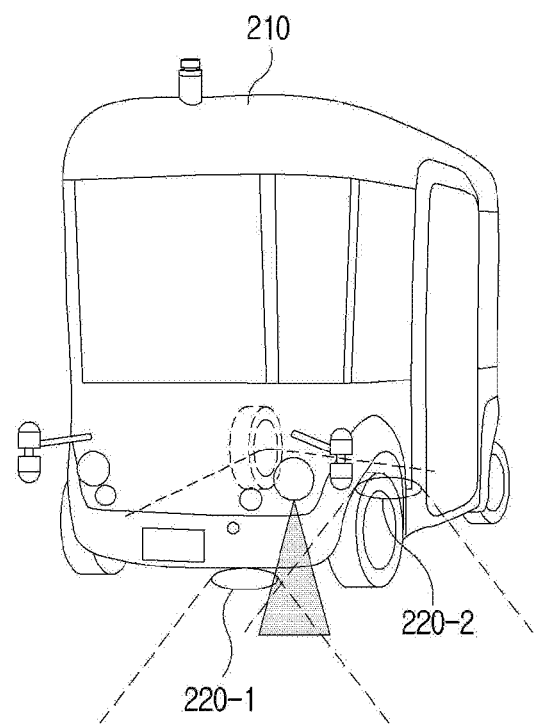
FIGS. 2A and 2B are diagrams illustrating an autonomous shuttle.
Figure 2B:
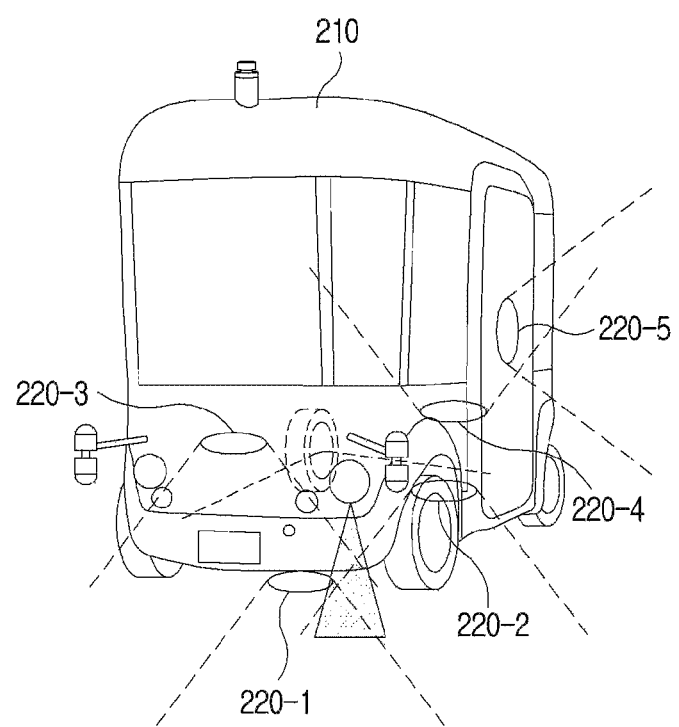

FIGS. 2A and 2B show a low cost autonomous shuttle. Referring to FIGS. 2A and 2B, an autonomous shuttle 210 may be provided in consideration of low cost. Herein, as an example, the low cost autonomous shuttle 210 may be a shuttle traveling in a predetermined area. Herein, the autonomous shuttle 210 may operate using a guideline on the road and a camera in consideration of the shuttle operation cost.

Herein, for example, the autonomous shuttle 210 may be a shuttle that operates on the basis of full autonomous driving. As another example, the autonomous shuttle 210 may be a shuttle in which some autonomous driving technology is implemented. In more detail, the shuttle may be a vehicle or a moving object operating on the basis of the autonomous driving function, in which the degree of autonomous driving may be different. For example, the degree of autonomous driving may be displayed as a level or a grade. A full self-driving automation-based shuttle may be marked at the highest level or grade. For example, different levels or grades may be displayed according to the degree of autonomous driving. In the following, the autonomous shuttle may be applied not only to a full self-driving autonomous shuttle in which all operations of the shuttle are controlled, but also to a shuttle partially performing an autonomous driving function. Hereinafter, both the shuttles will be referred to as an autonomous shuttle for convenience of explanation, which may be equally applied to a full self-driving autonomous shuttle and a partial self-driving autonomous shuttle.

Herein, as an example, a guideline may be a visually recognized line. As an example, the guideline may be a line visually installed on the road for the shuttle to recognize, such as a magnetic or fluorescent material. As another example, the guideline may be a non-visual line. For example, the guideline may not be installed on a road, but may be a line virtually set according to a moving route. That is, the guideline may mean a line set to be recognized by the shuttle even when it is not visually distinguished. For example, the guideline may be a virtual line indicated by an RSU, a peripheral device, a base station, or a server located in a route on which the shuttle travels. In other words, the peripheral devices provide a virtual guideline for the shuttle to travel on the route, and the shuttle can operate on the basis of the guideline.

As another example, the guideline may be generated on the basis of at least one of a moving route, a driving direction of the shuttle, and surrounding information. That is, the guideline may be provided to be generated in a specific case in consideration of the driving of the shuttle and to disappear when the driving is completed.

For example, the guideline may be installed along a route in which the autonomous shuttle 210 drives in a predetermined area. Herein, for example, the guideline may be installed to be recognized through cameras 220-1, 220-2, 220-3, 220-4, and 220-5 of the autonomous shuttle 210. That is, the autonomous shuttle 210 may recognize the guideline through the cameras 220-1, 220-2, 220-3, 220-4, and 220-5, and operate on the basis of the guideline. Meanwhile, the predetermined area may be set differently according to the system design. For example, the predetermined area may be a university campus or a certain area within an enterprise. Herein, the predetermined area may be set to a limited range to operate an autonomous shuttle at low cost, but the present disclosure is not limited thereto.

As another example, the shuttle 210 may be a general driving vehicle (or mobility). Herein, the shuttle 210 may mean a vehicle that travels on a corresponding route on the basis of a guideline or a command of a user, and is not limited to a specific vehicle or a specific region. For example, the shuttle 210 may be a general vehicle or a large vehicle such as a bus. Herein, the shuttle may operate on the basis of settings. For example, the shuttle 210 may be operated on a university campus as a predetermined area, as described above. In other words, the shuttle may operate on the basis of an area set in the system or a predetermined area capable of driving. In addition, as an example, the shuttle may be a vehicle circulating in the city center. In addition, the predetermined region may not be determined and may be varied according to a destination of the user.

As another example, the shuttle 210 may be a personal air vehicle (PAV). For example, the PAV may be a mobility capable of operating in the air under certain conditions without using a specialized facility such as a separate airport. For example, the shuttle 210 may be a PAV. That is, a shuttle in a type of the PAV may be operated as the shuttle operated as described above. For example, when the shuttle 210 is the PAV, the driving range of the shuttle may be set wider than that of an existing vehicle or moving object. As another example, when the shuttle 210 is a PAV, the above-described guideline or the driving route of the shuttle may be set within a range that does not affect existing vehicles and surrounding buildings. For example, the operation of the shuttle as the PAV may be set to only an area except a downtown area or a predetermined area, and the present disclosure is not limited thereto. That is, the shuttle 210 may be various types of moving bodies, but the present disclosure is not limited thereto.

In addition, for example, the shuttle 210 may be a shuttle controlled by a central server in consideration of the case where the shuttle 210 is operated in a predetermined area. As another example, the shuttle operated in a variable manner because the predetermined area is not determined may be a shuttle that operates on the basis of direct communication with the user device without control of the central server. That is, the shuttle 210 may be a device capable of providing a function as a shuttle to a user on the basis of authentication, identification, and security functions by itself, but the present disclosure is not limited thereto.

As another example, the shuttle 210 may operate on the basis of a map. Herein, for example, the map used by the shuttle 210 may be used with various types of maps, as a multi-map. For example, the multi-map may be a map related to the operation of the shuttle and other maps related to driving, and may include additional information required for the shuttle operation. Herein, the additional information may include at least one of traffic, weather, surrounding area information, event information, and shuttle state information required for shuttle operation. That is, the multi-map may include additional information related to the operation of the shuttle, and the present disclosure is not limited thereto.

In addition, the multi-map may include not only a driving region of the shuttle but also a map for three-dimensional space. In addition, for example, the multi-map may include a high definition (HD) map. For example, the multi-map may further include information about objects recognized as ultra-precision information, as well as information about a three-dimensional space represented by the multi-map. For example, the information about the surrounding objects recognized through the multi-map may be displayed through the HD map. As another example, the shuttle 210 may be provided with a device for providing an HD map as high-precision information about surrounding objects. For example, the shuttle 210 may include a high precision camera and other devices, and may provide the above-described multi-map or HD map on the basis of the same, but the present disclosure is not limited thereto.

In addition, for example, the multi-map may further include information on the public area in consideration of the above-described PAV. For example, the multi-map may further display information on surrounding objects located in the air, as well as information on route and surrounding objects located on the ground as information on buildings and surrounding vehicles. For example, the multi-map may obtain information about objects located in the air through the HD map as three-dimensional space information and ultra-precision information as described above. Herein, for example, the shuttle 210 may provide information on objects recognized in the ground and the air through the above-described map. In addition, as a specific example, when the shuttle 210 is a PAV, the map may provide information on objects in the air with respect to the shuttle driving. As another example, when the shuttle 210 is a PAV, the shuttle 210 may need to provide information about objects located on the ground as well as in the air in consideration of landing or parking. That is, the multi-map may obtain and display various types of object information in order to provide necessary information according to a driving state or a driving mode of the shuttle. Herein, for example, the multi-map may be provided through the above-described three-dimensional space information and the HD map as an ultra-precision map, but the present disclosure is not limited thereto.

In addition, as an example, the autonomous shuttle 210 communicates with a road side unit (RSU) and may be controlled on the basis of the RSU. Herein, for example, the RSU may be a device capable of communicating with a shuttle (or vehicle) disposed at a certain distance or periodically on the road. In addition, for example, the RSU may be a device disposed at a specific point on the road and capable of communicating with a shuttle (or vehicle). As another example, the RSU may refer to a terminal capable of communicating as a traffic infrastructure. As another example, the RSU may refer to a device capable of communicating with the shuttle (or vehicle) as a V2X terminal, a surrounding vehicle, a surrounding shuttle, or other moving objects. That is, the RSU refers to a device capable of communicating with the autonomous shuttle around the autonomous shuttle. Herein, for example, the autonomous shuttle 210 may receive driving related information from the RSU. In addition, the autonomous shuttle 210 may receive not only driving related information but also other information from the RSU, and the present disclosure is not limited thereto. As another example, the autonomous shuttle 210 may receive the driving related information from the RSU according to a predetermined period. Herein, the number of RSUs that transmit driving-related information to the autonomous shuttle 210 may be plural. For example, driving related information may be received from an adjacent RSU according to the driving of the autonomous shuttle 210. In addition, for example, the autonomous shuttle 210 may receive the driving related information from the RSU on the basis of event triggering. In more detail, the autonomous shuttle 210 may receive the driving-related information from the RSU in order to obtain necessary information when a user's command or a specific situation is detected. For example, the specific situation may be a case where the autonomous vehicle falls outside the guidelines, and the present disclosure is not limited thereto. That is, the autonomous shuttle may receive the driving-related information from the RSU, but the present disclosure is not limited thereto.

Meanwhile, for example, the autonomous shuttle 210 may include cameras 220-1, 220-2, 220-3, 220-4, and 220-5. Herein, the cameras 220-1, 220-2, 220-3, 220-4, and 220-5 may be devices capable of recognizing surrounding objects according to the installation direction. In other words, the camera is installed on the autonomous shuttle to recognize the guideline. Herein, for example, the cameras 220-1 and 220-2 may be installed at the bottom of the autonomous shuttle 210 as shown in FIG. 2A. For example, one camera or a plurality of cameras may be installed. Herein, the above-described guidelines may be recognized through the camera. In more detail, the autonomous shuttle 210 continuously recognizes the guideline through the camera (or cameras) installed at the bottom and may travel along the guideline.

In addition, for example, when a plurality of cameras 220-1 and 220-2 are installed, the autonomous shuttle 210 may obtain a depth image in order to increase the guideline recognition rate. For example, when the autonomous shuttle 210 recognizes the guideline through the cameras 220-1 and 220-2, the autonomous shuttle 210 generates the two-dimensional image through the cameras 220-1 and 220-2, and recognizes the guideline on the basis of the same. However, when there are obstacles or other objects in the guideline, the autonomous shuttle may not recognize the guideline correctly. That is, the guideline recognition rate may drop. In consideration of the foregoing, the autonomous shuttle 210 may obtain three-dimensional image information through the plurality of cameras 220-1 and 220-2. For example, the autonomous shuttle 210 may determine whether an obstacle exists in the guideline through a three-dimensional image or whether the image is not clearly recognized due to snow or rain.

In addition, for example, the guideline may be installed on the basis of various routes within a predetermined area. For example, the autonomous shuttle 210 may travel a region in which the guideline is installed with a plurality of routes. That is, the route in which the autonomous shuttle 210 is operated may be plural. For example, the guideline may be set in various directions at the intersection. In addition, the guideline may be set to a plurality of routes with respect to autonomous shuttle movement. Meanwhile, as an example, with respect to the guideline, autonomous shuttle route information may be calculated and stored in an autonomous shuttle or server on the basis of intersections and the number of possible routes. In addition, the autonomous shuttle or server may recognize the guideline on the basis of the route, which will be described later. That is, the autonomous shuttle may travel along a certain route while traveling along the guideline, and may travel a certain area.

In addition, for example, the camera and processor recognizing the guideline may be attached to and detached from the autonomous shuttle as a device. That is, as a device for controlling an autonomous shuttle traveling along a certain area, the camera and the processor may be detachable devices. Herein, the device described above can be attached to an autonomous shuttle to drive along a guideline, thereby reducing the limitations on running an autonomous shuttle. More specifically, as described above, a plurality of communication modules exists in the autonomous shuttle. Herein, the autonomous shuttle may also include a plurality of communication modules in consideration of autonomous shuttle security. For example, when the autonomous shuttle is allowed to be accessed from the outside, the risk of an accident may increase, whereby reliability of driving may not be secured. In view of the foregoing, the autonomous shuttle may be operated on the basis of the device attached to or detachable from the autonomous shuttle. For example, the device attachable to or detachable from the autonomous shuttle may include a plurality of communication modules. For example, the device attachable to or detachable from the autonomous shuttle may include a separate module capable of communicating only with the autonomous shuttle. Herein, the autonomous shuttle may communicate with a device that is attached to and detached from the autonomous shuttle via the module. In addition, the device attached to or detachable from the autonomous shuttle may communicate with other devices or servers on the basis of other modules. That is, the communication with the external device or the server is performed through the detachable device, and the control authority or the access authority of the autonomous shuttle may not be allowed from the outside, thereby increasing the security efficiency.

Meanwhile, for example, the autonomous shuttle may further include a plurality of cameras. In more detail, the autonomous shuttle may include cameras 220-1 and 220-2 at the bottom as shown in FIG. 2A. In addition, referring to FIG. 2B, the autonomous shuttle may further include cameras 220-1, 220-2, 220-3, 220-4, and 220-5 in at least one of the front side, the rear side, and the side surfaces. Herein, for example, the cameras 220-1 and 220-2 installed at the bottom may recognize a guideline to allow the shuttle to drive along the guideline. However, when the autonomous shuttle drives by recognizing the guideline through the cameras 220-1 and 220-2, the autonomous shuttle may not operate properly due to a guideline recognition error. In consideration of this point, the autonomous shuttle 210 may further include the cameras 220-3, 220-4, and 220-5. Herein, the cameras 220-3, 220-4, and 220-5 check the front and/or rear image to further check whether the autonomous shuttle 210 is operating properly. In addition, the cameras 220-3, 220-4, and 220-5 may check side images to determine whether the autonomous shuttle 210 is operating properly. As a specific example, when the autonomous shuttle 210 drives a predetermined area along the guideline, an image recognized by the front camera 220-3 may be repeated. That is, the image recognized from the front is limited to only the image which changes according to the route, and information thereon may be stored.

In addition, for example, the image recognized by the autonomous shuttle from at least one of the cameras 220-1, 220-2, 220-3, 220-4, and 220-5 may be an image of a driving route of the autonomous shuttle. In addition, for example, the autonomous shuttle 210 may recognize a predetermined area adjacent to the autonomous shuttle 210 through the cameras 220-1, 220-2, 220-3, 220-4, and 220-5. For example, an adjacent area capable of being recognized by the autonomous shuttle 210 may vary according to a setting. For example, the autonomous shuttle 210 may set the adjacent area to be small in order to increase the accuracy of the guideline recognition. For example, when the weather is cloudy or when the guideline is difficult to recognize, the recognition area may be small. As another example, when the guideline recognition rate is high or when the guideline is easy to recognize, the recognition range of the autonomous shuttle 210 may be widened. That is, the autonomous shuttle 210 may recognize the surrounding area or the driving route through at least one or more cameras 220-1, 220-2, 220-3, 220-4, and 220-5, but the present disclosure is not limited thereto.

As another example, the autonomous shuttle may recognize an obstacle through the camera described above. Herein, the autonomous shuttle may stop driving when the recognized obstacle is located on the guideline and the obstacle is located within a predetermined distance from the autonomous shuttle. Herein, for example, the autonomous shuttle may stop driving. In addition, for example, the autonomous shuttle may transmit a notification about the obstacle to a personal device or a server, and the obstacle may be removed on the basis of the notification.

Next, a specific driving method of the autonomous shuttle may be considered. For example, the autonomous shuttle may receive information for driving from a personal device or a server and operate on the basis of the information. In more detail, the autonomous shuttle may receive at least any one of starting position information, end position information, route information, travel time information, and travel speed information before starting driving. In addition, the autonomous shuttle may obtain other information necessary for driving in advance, but the present disclosure is not limited thereto. Herein, the starting position information, the end position information, and the route information may be set on the basis of the above-described guideline. For example, the personal device or the server may previously store the above-described guideline information on the basis of a certain area. Herein, the personal device or server may determine the starting position and the ending position on the basis of the previously stored guideline information, and set a route to the guideline on the basis of this. Herein, for example, the travel time information or the travel speed information may be further set in the autonomous shuttle. In addition, the route information of the autonomous shuttle may be set in consideration of the above-described travel time information or travel speed information, but the present disclosure is not limited thereto.

However, as an example, as described above, the autonomous shuttle drives along the guideline, and may require driving in consideration of guideline recognition. For example, when the autonomous shuttle performs driving in consideration of the above-described point, the operation at the intersection may be set. Herein, for example, the operation at the intersection may be controlled by performing communication with a road side unit (RSU).

Figure 3:
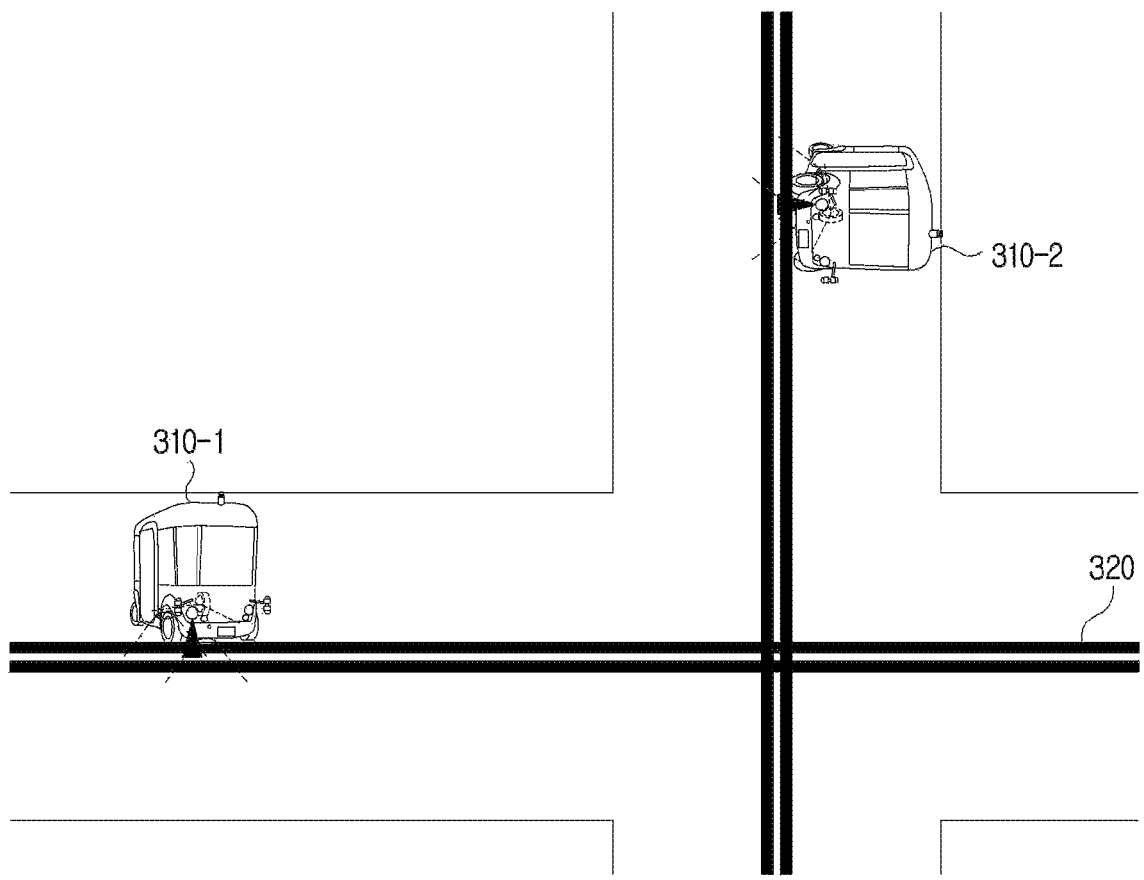
FIG. 3 is a diagram illustrating a method of driving an autonomous shuttle.

In addition, for example, referring to FIG. 3, the intersection operation of the autonomous shuttle may determine whether another vehicle or another shuttle exists at the intersection through the front camera. Herein, the autonomous shuttle 310-1 may continue to drive at the intersection when no other vehicle 310-2 or other shuttle 310-2 is present. Meanwhile, when the autonomous shuttle 310-1 detects the other vehicle 310-2 or the other shuttle 310-2 through the camera at the intersection, the autonomous shuttle 310-1 may transmit a signal to the other vehicle 310-2 or the other shuttle 310-2. Herein, for example, the autonomous shuttle 310-1 may transmit a signal for sensing an object, such as an ultrasonic wave. Accordingly, the autonomous shuttle 310-1 may detect a distance from the other vehicle 310-2 or the other shuttle 310-2. Thereafter, the autonomous shuttle 310-1 may determine the risk of collision with the other vehicle 310-2 or the other shuttle 310-2 at the intersection on the basis of information about the guideline 320. For example, the autonomous shuttle 310-1 may continue driving when it is determined that there is no risk of collision by securing a sufficient distance. Meanwhile, when the autonomous shuttle 310-1 determines that the distance is not sufficient and there is a risk of collision, the autonomous shuttle 310-1 may stop driving. Thereafter, the autonomous shuttle 310-1 may exchange signals with the other vehicle 310-2 or the other shuttle 310-2. Herein, the autonomous shuttle 310-1 may check the priority by exchanging signals with the other vehicle 310-2 or the other shuttle 310-2, and proceed with driving on the basis of the priority. That is, when it is determined that the autonomous shuttle 310-1 has the highest priority on the basis of the signal exchange, the autonomous shuttle 310-1 may continue driving. Meanwhile, when autonomous shuttle 310-1 has a priority lower than that of the other vehicle 310-2 or the other shuttle 310-2, the autonomous shuttle may stop driving until the other vehicle or shuttle completes driving.

As a more specific example, a plurality of shuttles may detect each other at the intersection. Herein, for example, each shuttle may detect a different shuttle via a camera or signal and then drive when there is no risk of collision. Meanwhile, each shuttle may stop driving on the basis of the risk of collision. Herein, for example, a plurality of shuttles may detect the risk of collision at the intersection and stop all driving. In the above-described situation, the plurality of shuttles may exchange signals with each other to determine the priority. Herein, for example, each of the shuttles may determine the priority on the basis of the order of the exchanged signals. That is, the shuttle that stopped first may transmit the signal first, and the shuttle that stopped first may have the highest priority. Herein, each of the shuttles may set the priority by checking the order of signals that it transmits and receives by itself, and proceed with driving on the basis of the priority. As another example, the shuttle may recognize other vehicles at an intersection on the basis of the RSU, which will be described later.

As another example, the autonomous shuttle may operate after distinguishing the shuttle from a normal vehicle through a camera. For example, the autonomous shuttle may store information about other shuttles traveling in the same area. Herein, for example, an autonomous shuttle may obtain image information about another shuttle through a camera and recognize another shuttle by matching the stored information. Herein, for example, the autonomous shuttle can be recognized as a normal vehicle when it is not recognized as a stored shuttle. Herein, the autonomous shuttle may always give a priority to the normal vehicle. More specifically, in relation to the autonomous shuttle and the shuttle previously stored in the autonomous shuttle, the priority is set on the basis of the related information, and the driving may be controlled. However, the autonomous shuttle may not store all the information about the normal vehicle, and there may be limitations in recognizing the information through the camera. In consideration of the foregoing, when the autonomous shuttle recognizes the normal vehicle through the camera, the priority may be given to the normal vehicle. That is, when the autonomous shuttle recognizes the normal vehicle through the camera at an intersection, the autonomous shuttle may stop driving and wait for the normal vehicle to drive. Accordingly, the autonomous shuttle can reduce errors caused by accidents and unrecognized vehicles.

Meanwhile, when the autonomous shuttle recognizes the pre-stored shuttle through communication with a camera, an RSU, or a server, the autonomous shuttle may perform driving on the basis of information about the corresponding shuttle. In addition, for example, the autonomous shuttle may recognize the pre-stored shuttle through communication with the RSU or through communication with the server. That is, the case of recognition through the camera, the case of the recognition through the RSU, or the recognition through communication with the server are applied in the same way as described above, but the case of recognition through the camera will be described below, for the convenience of description.

For example, the autonomous shuttle may store shuttle list information. Herein, the priority list for each shuttle may be set in the shuttle list. In other words, when the autonomous shuttle recognizes another shuttle at the intersection, the autonomous shuttle may interrupt driving temporarily to secure driving for the shuttle having a higher priority than itself. Meanwhile, the autonomous shuttle can cross an intersection without interrupting driving when the autonomous shuttle has a priority higher than those of other shuttles recognized. That is, the autonomous shuttle may drive on the basis of a predetermined priority, so that collision at the intersection may be prevented. Herein, for example, a predetermined priority may be set by the server or the system. For example, the predetermined priority may be different on the basis of the degree of billing. For example, when the autonomous shuttle user uses a high-priced autonomous shuttle, the priority may be higher than that of other shuttles, in which fast driving at an intersection may be guaranteed. Meanwhile, when the autonomous shuttle user uses a low-cost autonomous shuttle, the priority may be lower than that of other shuttles, in which the driving time may be longer. That is, the system or server may control the priority of the autonomous shuttle, thereby controlling the operation of the autonomous shuttle. As another example, the priority may be set by another method, but the present disclosure is not limited thereto.

As another example, when the autonomous shuttle recognizes a pre-stored shuttle rather than a normal vehicle, the autonomous shuttle may communicate with another shuttle. For example, the autonomous shuttles may communicate with each other on the basis of a preset method. In addition, for example, for security and accident prevention, the autonomous shuttles may be set in such a manner as to be capable of communicating with each other only, but the present disclosure is not limited thereto. Herein, for example, in the case of a normal vehicle, it may be unclear whether to perform communication with the autonomous shuttle. Accordingly, only when the autonomous shuttle recognizes a pre-stored shuttle, the autonomous shuttle may perform communication with the pre-stored shuttle. Herein, the autonomous shuttle may determine the priority at an intersection through communication with the pre-stored shuttle. That is, the autonomous shuttles may communicate with each other to determine which shuttle is guaranteed to drive at the intersection. For example, as described above, the shuttle that first transmitted the signal may be guaranteed to drive, but the present disclosure is not limited thereto.

In addition, for example, when the autonomous shuttle drives along a guideline, the autonomous shuttle may communicate with a server or personal device periodically to reduce driving errors. For example, the autonomous shuttle may drive along a guideline on the basis of the foregoing. Herein, the autonomous shuttle may send images obtained from a vehicle camera to a server (or personal device). Herein, the image obtained from the camera may be at least one or more of images obtained by capturing the guideline, the front, the rear, and the side, but the present disclosure is not limited thereto. Thereafter, the server may perform machine learning on the basis of the obtained image. For example, the server may periodically update an image obtained on the basis of a synthetic neural network, and store and update image information by learning a repeated image. The autonomous shuttle may then determine whether there is an error in the guideline recognition. That is, the autonomous shuttle may continue to drive along the guideline when there is no guideline recognition error. Meanwhile, when the autonomous shuttle fails to recognize the guideline, the autonomous shuttle may send information about the error to the server. That is, the autonomous shuttle may transmit a request for information to the server for checking the route. Herein, the server may check the driving route information of the autonomous shuttle on the basis of the information periodically obtained from the autonomous shuttle to perform machine running. That is, the server may check information on the error occurrence point and the future route of the autonomous shuttle through learning about the image that changes along the guideline. Herein, the server may provide route check information to the vehicle. This allows the autonomous shuttle to continue to drive along the guideline. In addition, the autonomous shuttle may periodically transmit relevant information to the server, and continue to drive in the event of a guideline recognition error. In view of the foregoing, the autonomous shuttle can continue to drive along the guideline in a given area, in which the driving can be performed at low cost.

As another example, GPS information may be further used to increase the accuracy of the above-described driving. More specifically, the GPS may be installed in the vehicle, and the vehicle may obtain location information on the basis of the GPS. Herein, even when the vehicle drives along the guideline on the basis of images obtained through the camera, the vehicle may further check whether to deviate from the route by obtaining additional location information. For example, as described above, when the guideline recognition rate is equal to or greater than a predetermined value and when no obstacle exists, the shuttle may drive along the guideline. Meanwhile, when the accuracy of the route is inferior, like when the recognition rate for the guideline is less than the predetermined value and when an obstacle exists, the location accuracy can be increased by using GPS. That is, the shuttle fundamentally moves along the guideline recognized through the camera, and additional location information is used to secure the reliability of driving.

As another example, the autonomous shuttle may operate by performing communication with a road side unit (RSU). In view of the foregoing, a device capable of communicating with the RSU may be installed in the shuttle. As an example, a communication module may be installed in the shuttle, and the shuttle may perform communication with surrounding RSUs through the communication module. However, when the shuttle continuously communicates with the RSUs, there may be restrictions on driving such as power consumption. Thus, the shuttle may fundamentally move along the guideline through a camera at the bottom. Herein, as described above, the shuttle may determine whether to perform communication with neighboring RSUs on the basis of an image recognized from at least one of the front, the rear, and the side surface. For example, when the obstacle is located within a reference distance on the basis of the images obtained from the front, rear and side, the shuttle may communicate with the RSU to avoid obstacles. That is, the shuttle operates as it is in normal operation, and may communicate with the neighboring RSUs only when the obstacle is recognized through the camera. Herein, surrounding RSUs may communicate with devices installed around the RSUs and other devices on the basis of infrastructure. Meanwhile, the communication performed in embodiments of the present invention may be performed on the basis of various methods, and the present disclosure is not limited thereto. Herein, when the RSU receives a request for an obstacle from the shuttle, the RSU may check information about the obstacle. For example, the RSU may check position information of the obstacle through communication with other devices and provide feedback information to the shuttle on the basis of the position information. Herein, the shuttle may stop driving on the basis of the received information. Thereafter, when it is determined that the obstacle is eliminated on the basis of the signal obtained from the RSU or the image information directly obtained by the shuttle, the shuttle may be driven again.

In addition, for example, as described above, there may be an intersection when the autonomous shuttle drives along the guideline. Herein, for example, when the autonomous shuttle recognizes an obstacle, the autonomous shuttle may communicate with the RSU and receive accurate information about the obstacle and operational information based thereon from the RSU. Accordingly, even when there is an intersection, the autonomous shuttle may obtain information about another shuttle or vehicle. That is, the operation of the autonomous shuttle may be controlled on the basis of the RSU that is present at the intersection.

In addition, for example, driving may be controlled when the shuttle is operated. For example, there is a need to control the starting position, the ending position, the driving speed, the driving position, and other driving related information with respect to the shuttle.

Herein, although the shuttle may drive along a guideline through camera recognition, the driving may be controlled through communication with the RSU. For example, referring to FIG. 6, the driving may be controlled through the camera, and the operation may be controlled through communication. For example, an RSU may be installed at a starting position, an ending position, and a stopping position of the shuttle. For example, there may be a pre-installed RSU such as a bus station, and the shuttle may communicate with the RSU.

In detail, the shuttle may receive information about the operation from the RSU at the starting position. Herein, the information about the operation may include at least one of stopping position (e.g. station) information, estimated operation time information, or operation region information. That is, the shuttle may receive the operation related information from the starting position. The shuttle can then start operation through the RSU at the starting position. Herein, the shuttle may turn the camera on, and recognize the guideline to perform the operation. Meanwhile, the shuttle may interrupt the operation by receiving a stop signal from the RSU at the stopping position (e.g. station). Herein, for example, the shuttle may receive information from the RSU at the stopping position. In addition, for example, it is possible to determine a time when the shuttle temporarily interrupts operation in consideration of operation related information received from the starting position and operation time information at the stopping position. In addition, for example, the shuttle may adjust the speed of the shuttle from the current stopping position to the next stopping position on the basis of information received from the starting position. That is, the information received from the starting position may include the estimated time and operation information for each stop point. Herein, the shuttle operates along the guideline through the camera, but specific speed and operation control may be performed via communication with the RSU. That is, the camera and the communication module may be installed in the vehicle in such a manner as to be operated at low cost, in which the driving control may be performed through the camera, and the operation control may be performed through the communication module. In addition, for example, the shuttle may transmit the operation information to the server, thereby preventing the accident.

In addition, as an example, in consideration of the above-described situation, the shuttle may previously receive information on the driving route from the server or the RSU at the starting position. Herein, the driving route information may be included in a map application as the route in which the guideline is installed. Herein, the shuttle may obtain location information via GPS, and display the location in a map application. Herein, for example, the shuttle may recognize the guideline and move to further check the route through the map application. In addition, it is possible to further check whether the shuttle is driving in a right direction through the guideline. That is, since the vehicle recognizes the map application and the location information along with the guideline, it is possible to further ensure reliability of driving.

In addition, for example, the autonomous shuttle may operate on the basis of edge computing. Herein, the edge computing may be configured to perform data processing through the device itself or a peripheral device without transmitting data processing to a data center (or cloud, server). For example, data processing efficiency may be improved through the edge computing. As another example, the security of data processing may be increased on the basis of distributed processing, and the present disclosure is not limited thereto.

Figure 4A:
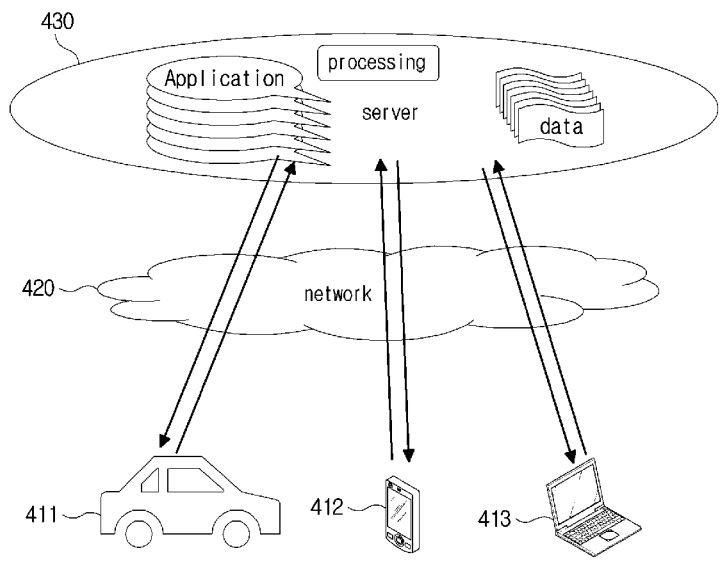
FIGS. 4A and 4B are diagrams illustrating a method of processing data using edge computing.

More specifically, referring to FIG. 4A, a data processing scheme may be used on the basis of an existing data center. For example, when performing data processing through a data center 430 (or cloud, server), each device 411, 412, and 413 (e.g., moving object, mobile device, and computer) may transmit the data to be processed through the network 420 to the data center 430. Herein, the data center 430 may process the received data using an application or the like and obtain a processing result. That is, the data center 430 may perform data processing on the transmitted data. Thereafter, the data center 430 may transmit the data processing result back to the respective devices 411, 412, and 413 through the network 420. That is, data for each of the devices 411, 412, and 413 may be processed in a centralized manner. However, in the above-described case, since the data center 430 needs to perform the processing for a plurality of devices, a delay may be caused in data processing. In addition, since the data itself should be transmitted to the data center 430, it may result in vulnerability to security.

Figure 4B:
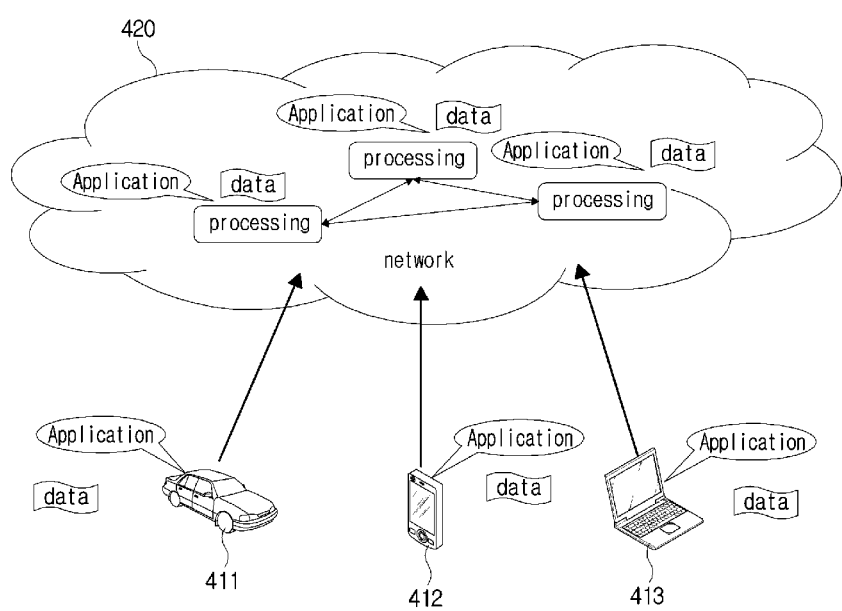

Meanwhile, FIG. 4B shows a method of processing data on the basis of edge computing. Herein, as an example, each of the devices 411, 412, and 413 may include a configuration capable of processing an application and other data by itself. That is, each of the devices 411, 412, and 413 may directly process data. In addition, as an example, data may be transmitted from the devices 411, 412, and 413 to the network 420. Herein, the data may not be transmitted to the data center, but may be processed through network neighboring nodes. Herein, as an example, the node may be configured to include an application and other devices capable of processing data in the network 420 and perform data distribution processing. For example, the node may refer to at least one of a device, a shuttle, and a vehicle. In addition, as an example, the node may be another device, and the present disclosure is not limited thereto. For example, the node may be a physical device, and may be a software configuration implemented in one device, but the present disclosure is not limited thereto. That is, data for each of the devices 411, 412, and 413 may not be transmitted to the data center but distributed into peripheral devices through the device itself or the network. In view of the foregoing, the speed of data processing can be improved, and security can be improved through distributed processing. A method of operating an autonomous shuttle on the basis of the foregoing will be described hereinafter.

As mentioned above, the autonomous shuttle may drive along the guideline. Herein, for example, when the guideline may not be recognized or when an error occurs in the guideline recognition, the autonomous shuttle may drive through other information. For example, as described above, the autonomous shuttle may utilize image information obtained through a camera, information stored in a server, or GPS information, as described above.

Figure 5:
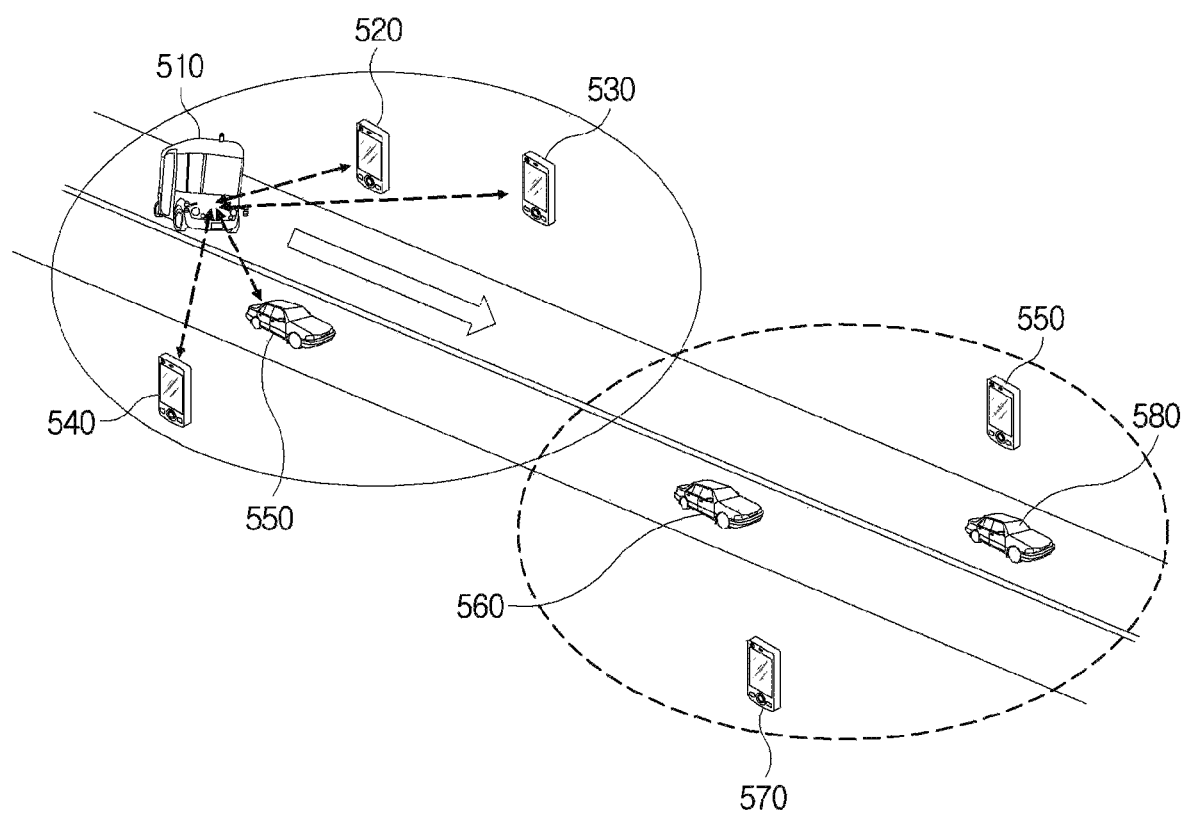
FIG. 5 is a diagram illustrating a method in which an autonomous shuttle recognizes a guideline using edge computing.

In addition, For example, referring to FIG. 5, when the guideline may not be recognized or an error occurs in the guideline recognition, the autonomous shuttle 510 may receive route related information from neighboring nodes 520, 530, 540, and 550 using edge computing and perform driving. Herein, for example, the neighboring nodes 520, 530, 540, and 550 may be devices, shuttles, and vehicles located within a predetermined distance from the autonomous shuttle 510. In addition, for example, the predetermined distance may be set differently depending on the range in which the autonomous shuttle 510 may communicate. For example, when there is no obstacle around the autonomous shuttle 510 and the communication environment is excellent, the predetermined distance may be set wide. Meanwhile, when an obstacle exists around the autonomous shuttle 510 and the communication environment is poor, the predetermined distance may be set small, but the present disclosure is not limited thereto.

In addition, for example, the predetermined distance may be set as a base station coverage in which the autonomous shuttle 510 is included. Herein, for example, with respect to edge computing, the base station may act as a cloud or server. That is, data processing is performed through nodes located in the base station coverage as a unit for edge computing, and the base station may be used as a cloud or a server managing each node, which will be described later. Meanwhile, referring to FIG. 5, the autonomous shuttle 510 may drive along a guideline and exchange data through communication with surrounding nodes.

Figure 6:
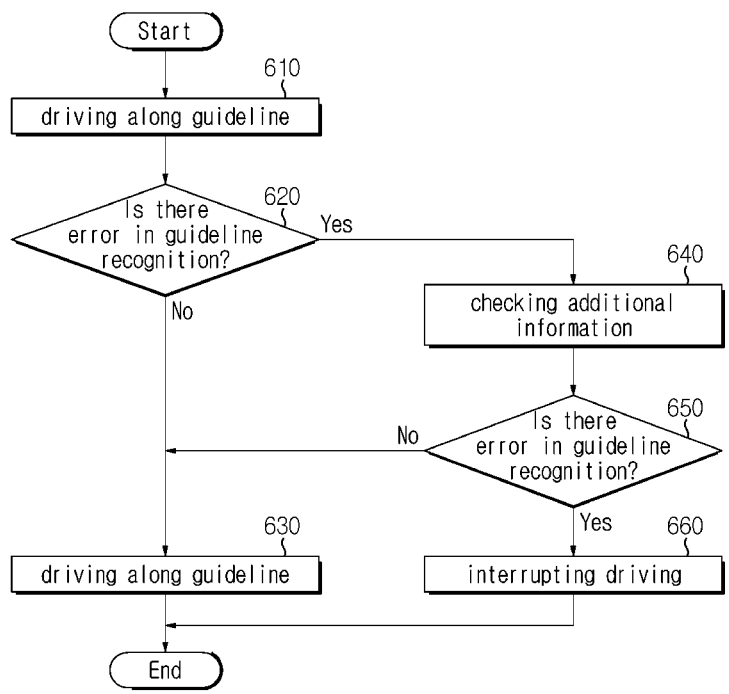
FIG. 6 is a diagram illustrating a method in which an autonomous shuttle checks route information using edge computing.

As a more specific example, referring to FIG. 6, the autonomous shuttle may drive along the guideline (S610). Herein, when there is no error in the recognition of the guideline (S620), the autonomous shuttle may drive along the guideline (S630). Meanwhile, when an error occurs in the guideline recognition (S620), the autonomous shuttle may check additional information (S640). Herein, as described above, the additional information may be a camera image of the autonomous shuttle or information received from the server, e.g., GPS information and the like, but the present disclosure is not limited thereto. However, as an example, the additional information may be information received from neighboring nodes using edge computing. More specifically, the autonomous shuttle may obtain additional information on its own when failing to recognize the guideline. Herein, when the autonomous shuttle is able to recognize the guideline with additional information or to drive along the route, the autonomous shuttle may perform the driving on the basis of the additional information. Meanwhile, when the autonomous shuttle may not recognize the guideline through additional information or may not determine the route, the autonomous shuttle may transmit a route related information request message to the surrounding nodes. Herein, for example, the route related information request message may include at least one of position information of the autonomous shuttle, predetermined route information, and image information obtained by the autonomous shuttle. In other words, the autonomous shuttle may transmit information about the location where the guideline recognition failure occurs and surrounding information related to the route recognition to the neighboring nodes. Herein, the neighboring nodes may obtain additional information related to the route on the basis of information included in the received route related information request message. For example, neighboring nodes may obtain image information around the autonomous shuttle on the basis of location information of the autonomous shuttle. In addition, for example, neighboring nodes may obtain information about the route of the autonomous shuttle on the basis of predetermined route information of the autonomous shuttle. In addition, for example, neighboring nodes may obtain image information corresponding to the image information obtained and transmitted by the autonomous shuttle. For example, neighboring nodes may obtain image information photographed from an angle different from image information obtained by the autonomous shuttle as image information of the same region. That is, the neighboring nodes may additionally check a variety of information to resolve errors regarding guideline recognition failure or path recognition failure.

Herein, as an example, the neighboring nodes may include the obtained information in response to the route related information request message in the route related information response message, to transmit the same to the autonomous shuttle. Herein, the autonomous shuttle may perform guideline recognition again using information obtained from the neighboring nodes (S650). Herein, when the autonomous shuttle may recognize the guideline and check the driving route, the autonomous shuttle may drive along the guideline as described above (S630). Meanwhile, when the autonomous shuttle does not check the guideline or the route information even by the information obtained from the neighboring nodes, the autonomous shuttle may stop driving (S660).

As another example, in the above-described case, the autonomous shuttle should process all data obtained from neighboring nodes, and thus the load for data processing increases. Therefore, the neighboring nodes may directly process the route information of the autonomous shuttle and provide only the information about the route to the autonomous shuttle. More specifically, the neighboring nodes can obtain relevant information according to the request of an autonomous shuttle, as described above. Herein, the neighboring nodes can directly identify the route on the basis of the route information or the position information of the autonomous shuttle. That is, the neighboring nodes may include an application associated with route setting of the autonomous shuttle, and directly check the route and provide the checked route information. As another example, the neighboring nodes may share the above-described path information with each other. Herein, it is possible to check whether there is an error in the route on the basis of the shared path information, and obtain highly accurate route information. Thereafter, the route information checked by the neighboring nodes may be delivered to the autonomous shuttle. Herein, the autonomous shuttle may drive on the basis of the received route information. Meanwhile, when the neighboring nodes do not check the route information, the neighboring nodes may transmit a route recognition failure message to the autonomous shuttle, and thus the autonomous shuttle may stop driving, but the present disclosure is not limited thereto.

Figure 7:
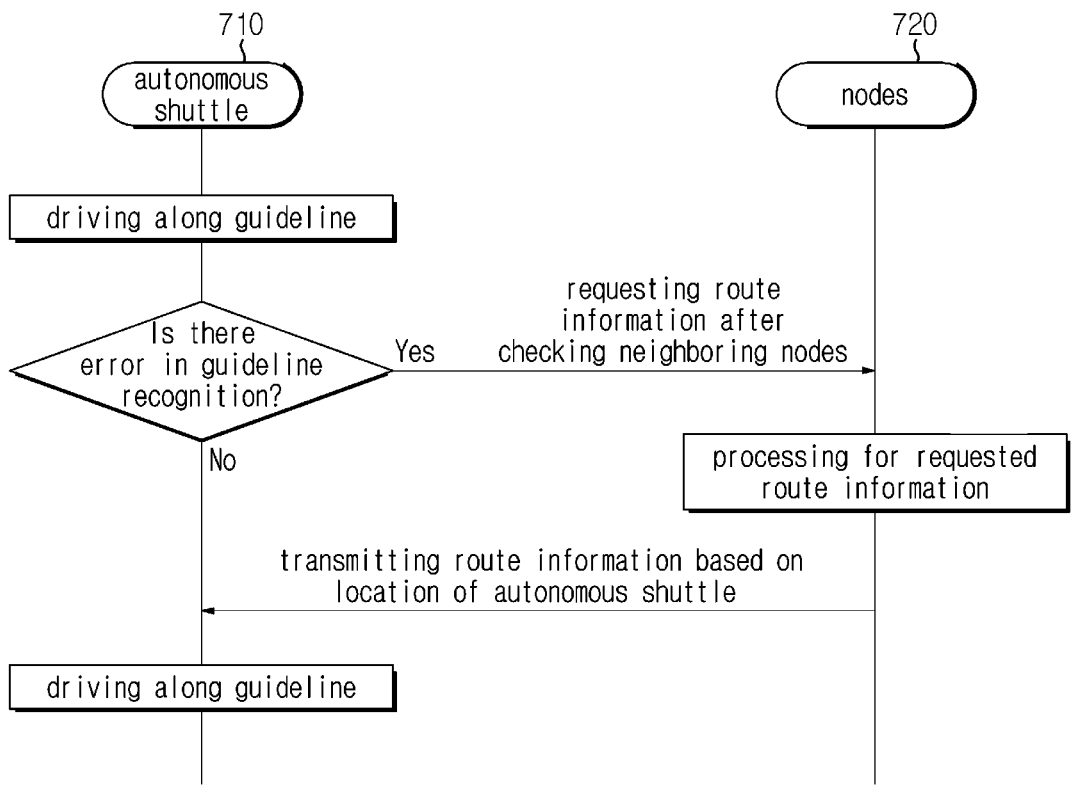
FIG. 7 is a diagram illustrating a method of operating an autonomous driving shuttle using edge computing.

FIG. 7 is a diagram illustrating a method of operating an autonomous shuttle on the basis of edge computing. Referring to FIG. 7, the autonomous shuttle 710 may drive along a guideline. Herein, for example, the autonomous shuttle 710 may drive in consideration of the guideline and surrounding image information. Herein, when the autonomous shuttle 710 is unable to recognize the guideline, or when the autonomous shuttle 710 is unable to check a route, the autonomous shuttle 710 may request the route related information from the neighboring nodes 720. Herein, for example, the autonomous shuttle 710 may identify neighboring nodes and request route related information. As an example, the autonomous shuttle 710 may search for neighboring nodes before requesting route related information, and perform signal authentication with the found neighboring nodes to perform authentication with each other. That is, the neighboring nodes may be nodes that are authenticated with the autonomous shuttle 710. As another example, the neighboring nodes may be nodes that are authenticated or registered by an operating system of the autonomous shuttle. For example, there may be a cloud or server associated with the autonomous shuttle operation. Herein, nodes associated with the autonomous shuttle operation may be authenticated or registered in the cloud or server. That is, the neighboring nodes may be nodes authenticated by a server, which will be described later.

Meanwhile, after the autonomous shuttle checks the neighboring nodes 720, the autonomous shuttle may transmit route related information to the neighboring nodes 720. Herein, the route related information may include at least one of position information of the autonomous shuttle, predetermined route information of the autonomous shuttle, and image information obtained by the autonomous shuttle. Thereafter, the nodes 720 may obtain the route related information of the autonomous shuttle 710 and transmit the information to the autonomous shuttle 710 as described above. Alternatively, the nodes 720 may perform data processing on the route information through the information obtained from the autonomous shuttle 710, and provide the autonomous shuttle 710 with the obtained route information itself. Herein, for example, the above-described information may be transmitted on the basis of the location of the autonomous shuttle, but the present disclosure is not limited thereto.

FIG. 8 illustrates a method of using an autonomous shuttle on the basis of edge computing. As another example, referring to FIG. 8, whether to use an autonomous shuttle may be determined on the basis of the neighboring nodes. More specifically, when a user uses an autonomous shuttle through the device, the autonomous shuttle and the neighboring nodes may be identified and authenticated on the basis of edge computing.

For example, referring to FIG. 8, the device 810 may select an autonomous shuttle 820. That is, the user may select the autonomous shuttle 820 to use through the device 810. However, in order to increase security and reliability of the autonomous shuttle 820, it is necessary to control the autonomous shuttle 820 only by the device 810 identified and authenticated. In consideration of the foregoing, when the device 810 selects an autonomous shuttle, the device 810 may transmit an autonomous shuttle usage request message to the autonomous shuttle 820. Herein, the autonomous shuttle 820 may transmit information for authentication and security to the neighboring nodes 830 on the basis of the autonomous shuttle usage request message. Herein, for example, autonomous shuttle 820 and neighboring nodes 830 may share authentication ledger information. That is, the autonomous shuttle 820 and the neighboring nodes 830 may include shared information for authentication. Herein, when the neighboring nodes 830 receive authentication and security information from the autonomous shuttle 820, the neighboring nodes 830 may generate a hash value on the basis of the authentication ledger information. That is, the neighboring nodes 830 may generate a predetermined value on the basis of the shared information. Herein, the neighboring nodes 830 may share the generated hash value. In addition, the neighboring nodes 830 may transmit the generated hash value to the autonomous shuttle 820. Herein, the autonomous shuttle 820 may perform authentication on the basis of the hash value received from the neighboring nodes 830, the ID information of the neighboring nodes 830, and the authentication ledger information. That is, the autonomous shuttle 820 may share authentication information on the basis of information shared with the neighboring nodes 830 and perform authentication on the basis of the plurality of nodes. Accordingly, the autonomous shuttle 820 may perform authentication through peripheral devices even when there is no server. In addition, since authentication may be performed through a plurality of distributed nodes, security may also be enhanced. The autonomous shuttle 820 may then complete the authentication and transmit a response to the device 810. Thereafter, the user may use the autonomous shuttle 820, but the present disclosure is not limited thereto.

Meanwhile, for example, with respect to the edge computing described above, a case where a cloud (or a server) exists (FIG. 9A) and a case where a cloud (or a server) does not exist (FIG. 9B) may be considered.

Figure 9A:
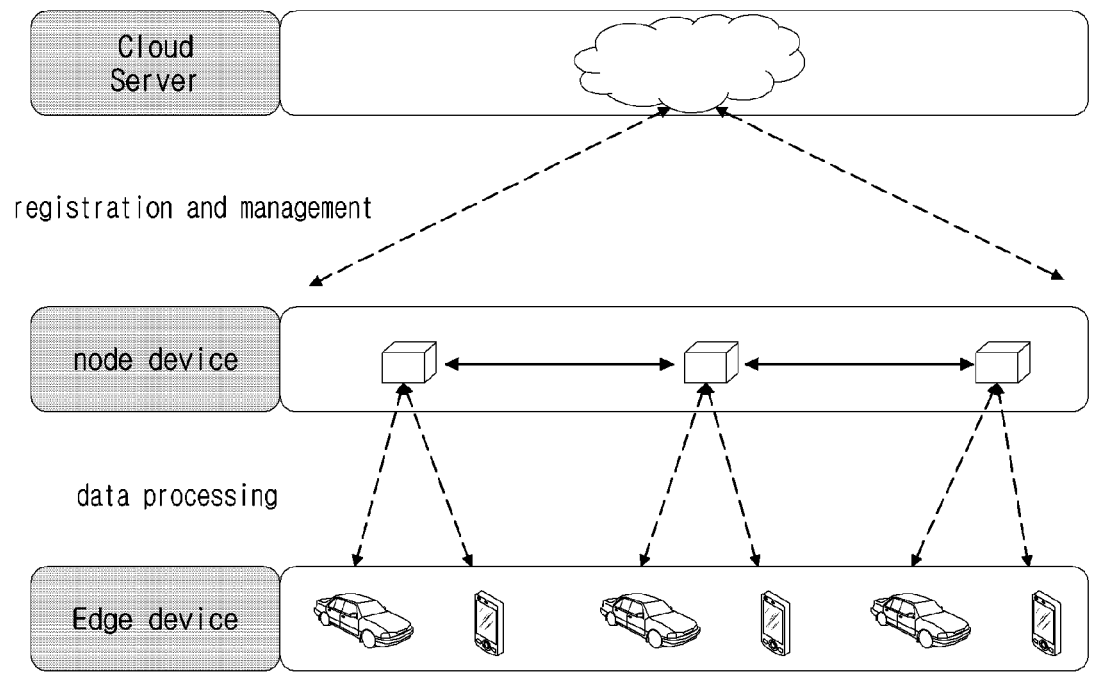
FIGS. 9A and 9B are diagrams illustrating a method in which an autonomous shuttle is operated using edge computing.

For example, referring to FIG. 9A, an autonomous shuttle may be provided on the basis of the edge computing described above. That is, information related to the operation of the autonomous shuttle may be obtained or processed from neighboring nodes through the network. Herein, for example, there may be a protocol for data exchange and processing between the cloud and each node with respect to operation of the autonomous shuttle. In addition, for example, there may be a protocol for exchanging and processing data between the nodes with respect to autonomous shuttle operation. That is, the protocol between the node and the cloud and the protocol between the nodes may be different types of protocols. As another example, a frame type required to exchange data between nodes and a frame type required to exchange data between the cloud and the node may be different from each other.

Herein, for example, in the cloud (or server), node registration and management for autonomous shuttle operation may be performed. More specifically, with respect to the autonomous shuttle operation, the autonomous shuttle may recognize the guideline, and the neighboring nodes may be registered or authenticated in the cloud to check the route, as described above. In other words, the cloud may share information for autonomous shuttle operation with nodes. Herein, each node may use the protocol set for data exchange with the cloud. In addition, each node may perform data transmission through a frame format used for exchanging data with the cloud. Herein, for example, data exchanged between nodes and the cloud may be information about registration and management of nodes. In addition, for example, most information may be processed at the nodes, but information required to be recorded or stored may be transmitted to the cloud. That is, information about registration and management and information required to be stored as history may be transmitted to the cloud. Herein, the autonomous shuttle and each of the nodes may exchange information about registration and management with the cloud on the basis of the protocol described above.

More specifically, when nodes are registered and managed in the cloud, the cloud may perform registration and management operations on the basis of location information of the nodes. In addition, the cloud may check information on whether nodes are in a state capable of performing data processing with respect to autonomous shuttle operation. The cloud communicates with the nodes and may authenticate whether the node is capable of data processing for autonomous shuttle operation on the basis of location information and state information of the node. Herein, the cloud may determine whether the node is capable of data processing for autonomous shuttle operation on the basis of periodic or event triggering. Herein, when the cloud has completed authentication for the node, the cloud may transmit authentication value information for the fleet system to the node. Herein, for example, the above-described authentication value may be a value generated in real time. The nodes may be in an inoperable state for data processing depending on the state and location of the nodes. In consideration of the foregoing, all nodes may not be capable of data processing for autonomous shuttle operation. Therefore, real-time authentication may be required for the nodes, and the above-described authentication value may be generated in real time. Herein, for example, the cloud and the autonomous shuttle may store an authentication value that is changed in real time. That is, the authentication value is changed in real time in the cloud, and the same value may be changed in real time in the autonomous shuttle. Herein, the cloud may periodically transmit the real-time changed authentication values to nodes capable of data processing. Herein, since the autonomous shuttle also stores the authentication value that is changed in real time as described above, the authentication value is compared with an authentication value received by the nodes to perform data processing and an authentication operation. In view of the foregoing, the data processing may be performed through the device and the nodes around the autonomous shuttle, and may operate without delay. Meanwhile, for example, the cloud may store list information about nodes that perform data processing on autonomous shuttle operation. Herein, as an example, as described above, a protocol in which the cloud performs data exchange with nodes and processing may be defined, and a frame format for the same may be defined, as described above.

In addition, for example, each node may perform data exchange using a protocol for data exchange between nodes. Herein, a frame format used by the nodes may differ from a frame format for communicating with the cloud as described above. That is, each node may set a separate protocol and frame for communication with each other. Herein, for example, data exchanged and processed between nodes may be information for checking the guideline or information required to be checked in real time. For example, as described above, when the autonomous shuttle may not recognize the guideline or may not determine the route, the autonomous shuttle may request neighboring nodes for additional information to recognize the guideline. Herein, when the autonomous shuttle transmits a request message to the neighboring nodes, the nodes may provide route related information to the autonomous shuttle or directly send processing information to the autonomous shuttle. That is, the autonomous shuttle may directly receive route related information from the neighboring nodes without exchanging data with the cloud. As a result, the autonomous shuttle may improve data security through distributed processing. In addition, the autonomous shuttle can perform data processing without delay by using a peripheral network.

Figure 9B:
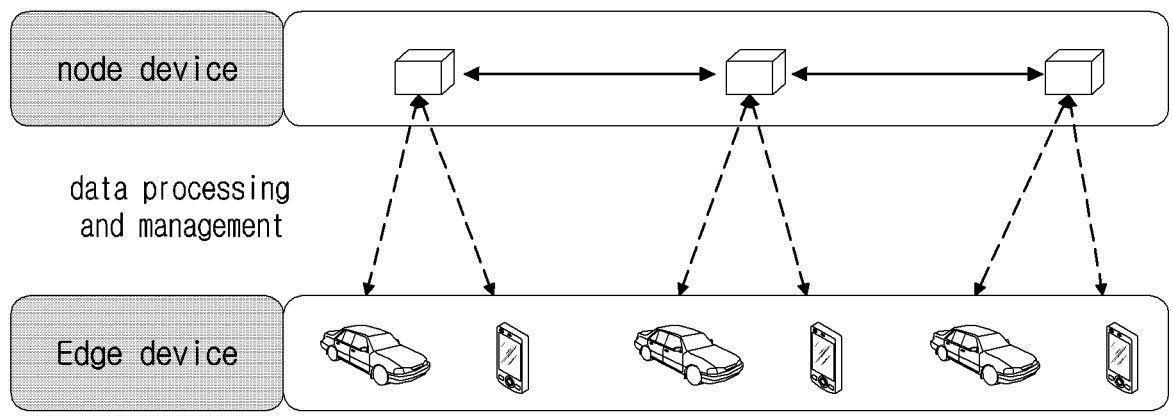

As another example, as shown in FIG. 9B, information for driving an autonomous shuttle may be shared or processed by neighboring nodes without a cloud. Herein, the neighboring nodes may previously set applications, programs or protocols for the autonomous shuttle. As an example, the neighboring nodes may previously install or include an application for the autonomous shuttle. In addition, the neighboring nodes may previously set a program or protocol for the autonomous shuttle. That is, the nodes operating for the autonomous shuttle may previously set applications, programs, and protocols for the fleet system, and the present disclosure is not limited thereto. Herein, for example, when the autonomous shuttle does not recognize the guideline, the autonomous shuttle may request additional information from the neighboring nodes. For example, the autonomous shuttle and neighboring nodes may include identification information capable of being recognized with each other on the basis of the same system or the same application. Herein, the neighboring nodes may transmit route related information and guideline recognition of the autonomous shuttle to the autonomous shuttle. In addition, for example, the neighboring nodes may directly perform data processing on the basis of information received from the autonomous shuttle, and directly transmit the processed information to the autonomous shuttle, as described above. In addition, the autonomous driving shuttle may secure the storage space by deleting information that is processed in real time and thus is not required to be stored after data processing. That is, the autonomous shuttle may play a direct role of storing data without a cloud, and may perform the data processing through neighboring nodes.

In addition, for example, the autonomous shuttle and neighboring nodes may include identification information capable of being recognized with each other on the basis of the same system or the same application. Herein, the autonomous shuttle may search for neighboring nodes on the basis of the above-described identification information, obtain information from the neighboring nodes, or perform data processing. Herein, as described above, the autonomous shuttle and the neighboring nodes may share authentication ledger information. Herein, the neighboring nodes may generate hash values through the information received from the autonomous shuttle and the shared ledger information, and may perform authentication and identification on the basis of the hash values, as described above. The autonomous shuttle may operate on the basis of edge computing.

Figure 10:
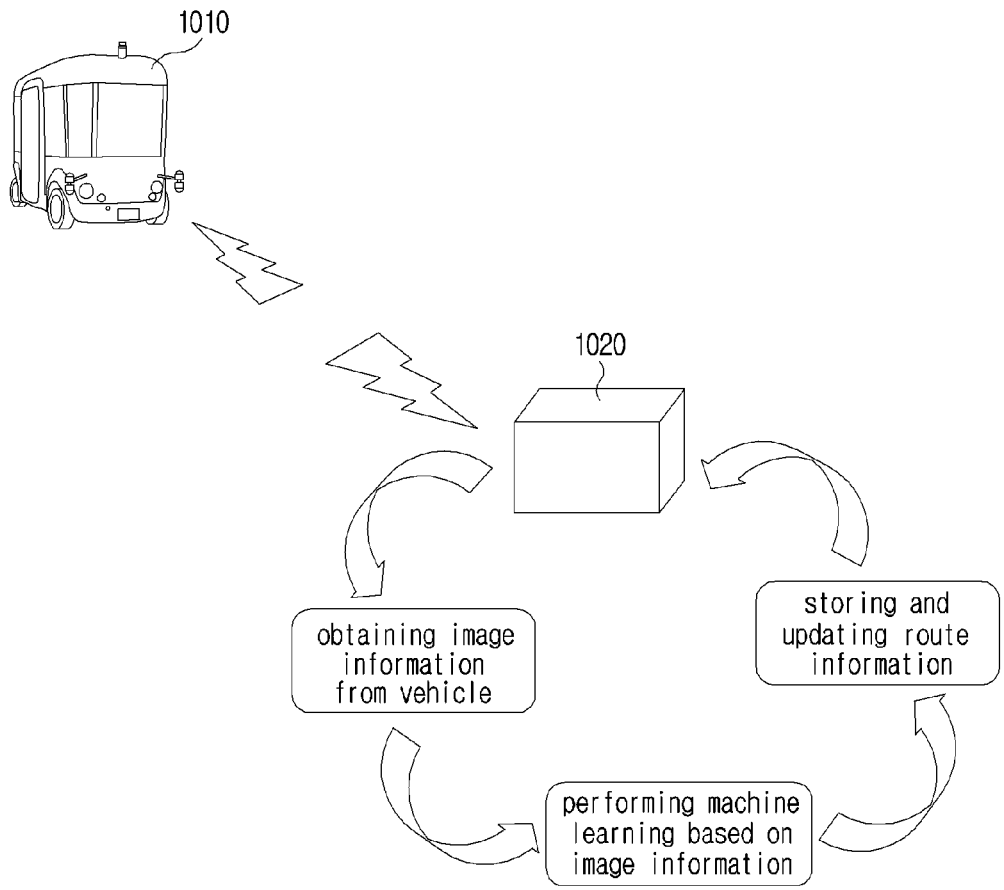
FIG. 10 is a diagram illustrating a method in which an autonomous shuttle updates route information on the basis of machine learning.

In addition, for example, referring to FIG. 10, the autonomous shuttle 1010 may continuously update information on the front image through machine learning. For example, the autonomous shuttle 1010 periodically transmits the image obtained from the front side to the server, and the server may continuously update the information on the front side image through machine learning. In view of the foregoing, when the autonomous shuttle 1010 drives along the guideline, it is possible to check whether the autonomous shuttle deviates or not. That is, even when the autonomous shuttle 1010 does not clearly recognize the guideline through the camera at the bottom, the autonomous shuttle 1010 further compares the previously stored front side image with the current image, so that it is determined whether the vehicle is operating properly. This can increase the driving reliability.

More specifically, the autonomous shuttle 1010 may periodically transmit the image information obtained through the camera to the server. Herein, the server may perform the machine learning on the basis of the periodically obtained image, and store the image information on the basis of a route of the autonomous shuttle. Herein, in the case of the autonomous shuttle, since the area capable of driving is limited to a predetermined area, the number of images to be obtained and analyzed may be limited, and therefore data processing may be sufficient. That is, the amount of data to be processed can be reduced.

As another example, the autonomous shuttle 1010 may recognize the guideline through the camera at the bottom and then drive. Herein, a guideline recognition error is caused in the autonomous shuttle 1010. For example, the guideline recognition error may be a case where the guideline may not be identified by a camera to be more than a predetermined ratio. For example, it may be considered that the guideline is not recognized due to obstacles at the bottom when it snows or rains. Herein, when the recognition rate for the guideline is less than or equal to the predetermined ratio, the autonomous shuttle 1010 may determine a guideline recognition error. When the autonomous shuttle 1010 determines a guideline recognition error, the autonomous shuttle 1010 may request information for a route confirmation from the server. Herein, the server may provide route confirmation information to the autonomous shuttle 1010 as information obtained through machine learning on the basis of image information periodically obtained from the autonomous shuttle 1010 and other information. For example, as described above, since the autonomous shuttle 1010 drives a predetermined route, the image information recognized by the autonomous shuttle 1010 may be repeated, and the route may be confirmed on the basis of the same. Thereafter, the autonomous shuttle 1010 may drive along the guideline on the basis of the image information obtained from the server. Herein, the autonomous shuttle 1010 continuously recognizes the guideline by using the camera at the bottom, and may again drive along the guideline when the recognition rate of the guideline is higher than a predetermined ratio. In addition, the autonomous shuttle 1010 may periodically transmit the obtained image information to the server later.

Meanwhile, For example, even when the autonomous shuttle 1010 does not properly recognize a route through the above-described process, the operation of the autonomous shuttle 1010 may be stopped and an error message may be transmitted to the server, but the present disclosure is not limited thereto. Through the above, the autonomous shuttle enables driving in a predetermined area by attaching the camera, thereby operating the autonomous shuttle at low cost.

As another example, referring to FIG. 10, the autonomous shuttle 1010 may obtain image information through the neighboring nodes 1020 and store and update route information through machine learning. In more detail, the autonomous shuttle 1010 may check the forward image to recognize the driving route as described above. Herein, neighboring nodes 1020 may be used to increase the accuracy of the forward image. For example, the peripheral node may be any one of other devices, shuttles, or vehicles located within a predetermined distance from the autonomous shuttle 1010 as described above. In addition, for example, as described above, the predetermined distance may be set within a range of a base station through which the autonomous shuttle 1010 communicates, and the present disclosure is not limited thereto. Herein, for example, the autonomous shuttle 1010 may transmit image information to the neighboring nodes. Herein, each of the neighboring nodes 1020 is located within a predetermined distance from the autonomous shuttle 1010, and thus may obtain an image related to the image information obtained by the autonomous shuttle 1010 by itself. Herein, as described above, the nodes may be devices, shuttles, or vehicles, so that each node may itself obtain image information. Herein, each of the neighboring nodes 1020 may compare the image information obtained by the neighboring nodes 1020 with the image information received from the autonomous shuttle 1010, and update and store route information as information related to the image information. Each of the neighboring nodes 1020 may then transmit the updated information to the autonomous shuttle 1010. That is, the autonomous shuttle 1010 may share image information with neighboring nodes, receive route information updated by neighboring nodes, and update the image information. As described above, the autonomous shuttle 1010 may obtain highly reliable image information. Accordingly, the autonomous shuttle 1010 can reduce the error of route recognition.

As another example, a method of increasing the recognition rate of the guideline may be considered. For example, it is possible to increase the recognition ratio of the guideline through a lamp or a light emitting part of the autonomous shuttle. More specifically, since the light is located at the bottom of the autonomous shuttle, the light may be blocked, and therefore the guideline recognition rate may be decreased. To compensate for this, there may be a lamp or a light emitting part capable of illuminating the guideline. As another example, the shuttle may further include a display unit and additionally determine whether the shuttle moves along the guideline through the map application. As an example, the shuttle may display a map application. Herein, information about the guideline may be shared in advance. In addition, the guideline may be complicatedly installed or set in various ways.

Figure 11:
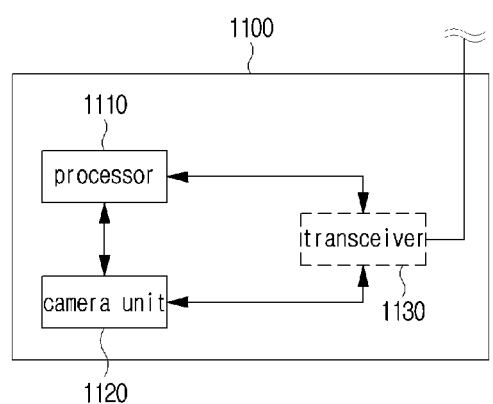
FIG. 11 is an apparatus diagram illustrating an autonomous shuttle.

FIG. 11 is a diagram illustrating an autonomous shuttle. Referring to FIG. 1i, the autonomous shuttle 1100 may include a processor 1110 and a camera unit 1120. Herein, the processor 1110 may be an entity for controlling the autonomous vehicle as described above. For example, the processor 1110 may be a hardware configuration. As another example, the processor 1110 may be a software configuration that performs the operation of controlling the above-described autonomous vehicle, and is not limited to the above-described embodiment. In addition, for example, the autonomous shuttle 1100 may include a camera unit 1120. Herein, the camera unit 1120 may include at least one camera as described above. As an example, the camera unit 1120 may obtain a guideline image at the bottom of the vehicle. In addition, for example, the camera unit 1120 may further include a camera for obtaining an image of at least one of front, rear, and side surfaces, as described above.

In addition, as an example, the autonomous shuttle 1100 may further include a transceiver 1130. Herein, for example, the processor 1110 of the autonomous shuttle 1100 may communicate with another device through the transceiver 1130, as described above.

While the example methods of the present disclosure described above are represented as a series of operations for clarity of description, it is not intended to limit the order in which the steps are performed, and each step may be performed simultaneously or in a different order as necessary. In order to implement the method according to the present disclosure, the illustrated step may further include other steps, may include remaining steps except for some steps, or may include other additional steps except for some steps.

The various embodiments of the present disclosure are not an exhaustive list of all possible combinations, and are intended to describe representative aspects of the present disclosure, and the matters described in the various embodiments may be applied independently or in combination of two or more.

In addition, various embodiments of the present disclosure may be implemented by hardware, firmware, software, or a combination thereof. The hardware may be implemented by one or more of application specific integrated circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like.

It is intended that the scope of the disclosure includes software or machine-executable instructions (e.g., an operating system, an application, firmware, a program, etc.) that causes an operation in accordance with various embodiments to be executed on an apparatus or a computer, and non-transitory computer-readable media that are executable on a device or computer in which such software or instructions, and the like are stored.

What is claimed is:

1. A method of operating an autonomous shuttle, the method comprising:
    attempting to recognize a guideline provided on a driving route of the autonomous shuttle based on a route recognition device of the autonomous shuttle;
    transmitting an additional information request message to first nodes external to the autonomous shuttle and located within a predetermined range from the autonomous shuttle when failing to recognize the guideline, wherein the autonomous shuttle and the first nodes are capable of operating on the basis of edge computing so that the additional information request message is transmitted to the first nodes without being transmitted to any data center, cloud or server;
    receiving a response message to the additional information request message from the first nodes, the response message being received from the first nodes without going through any data center, cloud, or server; and
    driving along the guideline based on the received response message.

2. The method of claim 1, wherein:
    the route recognition device includes a camera provided in the autonomous shuttle; and
    attempting to recognize the guideline is based on the camera.

3. The method of claim 1, further comprising displaying information obtained through the route recognition device through a map of the autonomous shuttle, wherein the information obtained through the route recognition device includes at least one of information on the guideline or information on surrounding objects of the autonomous shuttle.

4. The method of claim 3, wherein the map of the autonomous shuttle is displayed as at least one of a two-dimensional map, a three-dimensional map, a multi-map, or a high definition (HD) map.

5. The method of claim 1, further comprising performing data exchange between the autonomous shuttle and the first nodes through a first frame format based on a first type protocol.

6. The method of claim 5, further comprising performing data exchange with a cloud by the autonomous shuttle or the first nodes through a second frame format based on a second type protocol.

7. The method of claim 6, wherein the data exchanged between the autonomous shuttle and the first nodes based on the first type protocol includes at least one of guideline recognition information, route related information, or real-time processing information.

8. The method of claim 6, wherein the data exchanged between the cloud and the autonomous shuttle or the first nodes based on the second type protocol includes at least one of node registration information, node management information, or history information.

9. The method of claim 8, further comprising receiving the node registration information or the node management information from the cloud through the second type protocol based on location information of the autonomous shuttle.

10. The method of claim 5, wherein the first type protocol and the first frame format are preset between the autonomous shuttle and the first nodes when the autonomous shuttle does not perform communication with a cloud.

11. The method of claim 10, further comprising storing history information in the autonomous shuttle, wherein the data exchanged between the autonomous shuttle and the first nodes based on the first type protocol includes at least one of guideline recognition information, route related information, or real-time processing information.

12. The method of claim 1, wherein the autonomous shuttle is provided with at least one camera for photographing a driving road, and the guideline is recognized through the at least one camera for photographing the driving road.

13. The method of claim 12, wherein when the autonomous shuttle fails to recognize the guideline, the method further comprises transmitting the additional information request message to the first nodes based on a location where the autonomous shuttle fails to recognize the guideline.

14. The method of claim 13, further comprising:
    obtaining image information, by each of the first nodes, at the location of the autonomous shuttle based on the received additional information request message; and
    transmitting the obtained image information to the autonomous shuttle.

15. The method of claim 14, further comprising:
    receiving the obtained image information from each of the first nodes in the response message; and
    re-attempting to recognize the guideline through the image information included in the response message.

16. The method of claim 15, further comprising interrupting driving of the autonomous shuttle when the autonomous shuttle fails to recognize the guideline.

17. The method of claim 13, further comprising:
    obtaining, by each of the first nodes, image information at the location of the autonomous shuttle based on the additional information request message;
    directly obtaining, by each of the first nodes, route information of the autonomous shuttle based on the obtained image information; and
    transmitting, by each of the first nodes, the obtained route information to the autonomous shuttle.

18. The method of claim 17, further comprising:
    receiving the response message from each of the first nodes; and
    driving according to the route information included in the response message.

19. An autonomous shuttle driving in an autonomous driving manner, the autonomous shuttle comprising:
    a route recognition device that includes a camera unit;
    a transceiver; and
    a processor coupled to the camera unit and the transceiver, wherein the processor is configured to:
        attempt to recognize a guideline provided on driving route of the autonomous shuttle based on the route recognition device of the autonomous shuttle;
        control the transceiver to transmit an additional information request message to first nodes located external to and within a predetermined range from the autonomous shuttle when failing to recognize the guideline;

control the transceiver to receive a response message to the additional information request message from the first nodes; and control the autonomous shuttle to drive along the guideline based on the received response message;

wherein the autonomous shuttle and the first nodes are capable of operating on the basis of edge computing so that communication can be performed between the autonomous shuttle and the first nodes without transmitting data to a data center, a cloud, or a server.

20. A system for operating an autonomous shuttle, the system comprising:

an autonomous shuttle comprising a route recognition device; and a plurality of nodes, each node being part of a vehicle;

wherein the autonomous shuttle is configured to attempt to recognize a guideline provided on driving route of the autonomous shuttle based on the route recognition device;

wherein, when the attempt to recognize the guideline fails, the autonomous shuttle is configured to transmit an additional information request message to ones of the nodes located within a predetermined range from the autonomous shuttle;

wherein the autonomous shuttle is configured to receive a response message to the additional information request message from the nodes;

wherein the autonomous shuttle is configured to drive along the guideline based on the received response message; and wherein the autonomous shuttle and the nodes are capable of operating on the basis of edge computing so that communication can be performed between the autonomous shuttle and the nodes without transmitting data to a data center, a cloud, or a server.

* * * * *